(12) United States Patent
Lee

(10) Patent No.: US 7,441,259 B2
(45) Date of Patent: Oct. 21, 2008

(54) OPTICAL RECORDING MEDIA CARTRIDGE

(75) Inventor: Seong Hun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 11/272,646

(22) Filed: Nov. 15, 2005

(65) Prior Publication Data

US 2006/0107280 A1    May 18, 2006

(30) Foreign Application Priority Data

Nov. 16, 2004   (KR)   ........................ 10-2004-0093450
Dec. 3, 2004    (KR)   ........................ 10-2004-0100924

(51) Int. Cl.
*G11B 23/03*   (2006.01)

(52) U.S. Cl. .................................................. 720/733

(58) Field of Classification Search ................. 720/733; 360/133

See application file for complete search history.

(56) References Cited

U.S. PATENT DOCUMENTS

| 4,665,457 | A  | * | 5/1987 | Odawara et al. | 360/133 |
|---|---|---|---|---|---|
| 5,548,577 | A | * | 8/1996 | Miyazaki et al. | 720/733 |
| 5,954,198 | A | * | 9/1999 | Ikebe et al. | 206/308.3 |
| 6,964,335 | B1 | * | 11/2005 | Harris | 206/308.1 |
| 7,251,104 | B2 | * | 7/2007 | Abe et al. | 360/133 |
| 2004/0257705 | A1 | * | 12/2004 | Abe et al. | 360/133 |
| 2005/0028187 | A1 | * | 2/2005 | Park et al. | 720/740 |
| 2006/0282846 | A1 | * | 12/2006 | Kaneda et al. | 720/728 |
| 2007/0025019 | A1 | * | 2/2007 | Kaneda et al. | 360/133 |

* cited by examiner

*Primary Examiner*—Allen T Cao
(74) *Attorney, Agent, or Firm*—Birch, Stewart, Kolasch & Birch, LLP

(57) ABSTRACT

An optical recording media cartridge includes an optical recording medium, an upper frame facing a first surface of the optical recording medium, the optical recording medium rotatably coupled to the upper frame, and a lower frame facing a second surface of the optical recording medium, the lower frame being slidably coupled to the upper frame.

18 Claims, 5 Drawing Sheets

OPTICAL RECORDING MEDIA CARTRIDGE

BACKGROUND OF THE INVENTION

1. Field of the Invention

The present invention relates to an optical recording media cartridge.

2. Description of the Related Art

In recent years, an optical recording media cartridge has been miniaturized in response to the trendy of the miniaturization and elegant style of the electronic appliances. Accordingly, an optical storage drive for driving a coin-sized disk has been developed so that it can be applied to the subminiature electronic appliances.

In order to improve the portability, the overall size of the optical storage drive must be reduced. Especially, the optical storage drive must be designed to conform to a standard thickness so that it can be applied to the portable electronic appliances.

Meanwhile, a standard thickness of a conventional memory card is 5 mm. Therefore, laptop computers and personal digital assistants (PDA) are designed to have an adaptor structure conforming to the standard thickness. In order to have the optical storage drive conform to the standard thickness, the development of a thin spindle motor as well as a media cartridge having a small thickness is an essential requirement.

As shown in FIG. 1, a prior disk cartridge includes a case 101 in which an information storage disk 102 is mounted and a shutter 103 installed on a portion of the case 101 to selectively expose a portion of the disk 102. When the disk cartridge is inserted in the optical disk drive and the shutter 103 is open, a window 104 is defined on an initial shutter location to expose a portion of the disk 102, on which an optical system is located.

As shown in FIG. 2, the case 101 of the disk cartridge 105 includes top and bottom frames 101a and 101b. Small gaps are defined between the disk 102 and the top and bottom frames 101a and 101b. A hub 107 is formed on a center of the disk 102 and exposed to an external side so as to engage with a driving motor rotating the disk 102.

A thickness of the above-described disk cartridge 105 is determined by the thicknesses of the top and bottom frames 101a and 101b, the thickness of the disk 102, and operational spaces defined between the disk 102 and the case 101 to provide spaces required for the rotation of the disk 102. The operational spaces of the disk cartridge 105 are determined considering the strength of each element, the possibility of the injection molding, the integrated tolerance error, and the drooping and tilting of the disk 102.

That is, the disk cartridge 105 is designed such that the frames encloses the disk 102 to protect the disk 102 and the shutter 103 must be installed to selectively expose a predetermined portion of the disk 102 so that the access of the information stored in the disk 102 is possible through the exposed portion. Furthermore, the disk cartridge 105 is designed such that, when the disk cartridge 105 is inserted and loaded in the drive, the shutter 103 is opened, and when the disk cartridge 105 is withdrawn out of the drive, the shutter 103 is closed.

However, the shutter 103 for automatically opening/closing the case 101 must be provided with a shouter spring restoring portion. In addition, the overall thickness of the disk cartridge 105 is increased by the thickness of the shutter 103.

Therefore, due to the above-described reasons, it is difficult to reduce the thickness of the disk cartridge 105 that must be designed in a subminiature-size. That is, there is a limitation in reducing the physical size of the drive.

SUMMARY OF THE INVENTION

Accordingly, the present invention is directed to an optical recording media cartridge that substantially obviates one or more problems due to limitations and disadvantages of the related art.

An object of the present invention is to provide an optical recording media cartridge that can be designed in a subminiature-size.

Another object of the present invention is to provide an optical recording media cartridge formed in a simple structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical recording media cartridge including; an optical recording medium; an upper frame facing a first surface of the optical recording medium, the optical recording medium rotatably coupled to the upper frame; and a lower frame facing a second surface of the optical recording medium, the lower frame being slidably coupled to the upper frame.

In another aspect of the present invention, there is provided an optical recording media cartridge including; an optical recording medium; an upper frame facing a first surface of the optical recording medium, the optical recording medium rotatably coupled to the upper frame; and first and second lower frames facing a second surface of the optical recording medium, the first and second lower frames being slidably coupled to the upper frame.

In still another aspect of the present invention, there is provided an optical recording media cartridge including: an optical recording medium; a first frame coupled to the optical recording medium; a second frame slidably coupled to the first frame to selectively expose a diameter portion of the optical recording medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following embodiments, a disk cartridge using an optical disk that is one of optical recording media are exampled. However, the optical recording media of the present invention are not limited to the optical disk.

Figure 3:
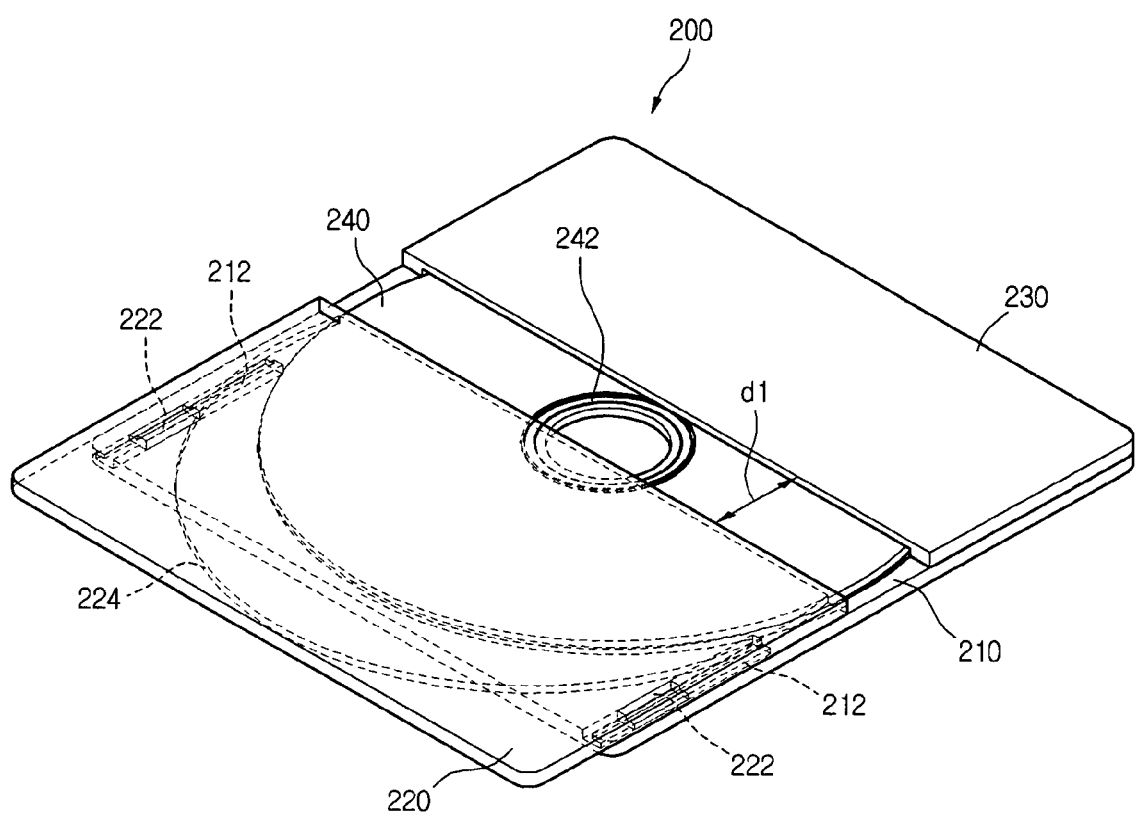
FIGS. 3 through 5 are views of an optical recording media cartridge according to a first embodiment of the present invention.

FIG. 3 illustrates a view of an optical recording media cartridge according to a first embodiment of the present invention.

Referring to FIG. 3, a disk cartridge 200 includes an upper frame 210, a first lower frame 220, a second lower frame 230, and a disk 240. In the description of this first embodiment, the disk 240 is regarded as an optical disk.

The disk 240 is a digital information storage medium that can record and read the data using an optical method. For example, the disk 240 is formed of an acryl resin substrate on which metal such as aluminum is deposited to define a recording layer. By detecting reflecting or transmitting light obtained by irradiating laser to a track formed on the recording layer, the recorded data can be read.

The upper frame 210 is formed of a plate type material defining a housing. Likewise the conventional disk housing, the upper frame 210 is formed in a rectangular shape. The disk 240 is rotatably fixed on a bottom of the upper frame 210. Two parallel rail grooves 212 are formed on both edge portions of the upper frame 210.

In FIG. 3, the upper frame 210 is illustrated below the lower frames 220 and 230. This is just for the descriptive convenience.

The disk cartridge 200 of the first embodiment may be inserted in a drive in a state where the disk cartridge 200 is reversed from a state illustrated in FIG. 3.

The first lower frame 220 is sized to cover a region from an end of the upper frame 210 to a spindle portion 242 of the disk 240 and slidably coupled to the upper frame 210.

That is, the first lower frame 220 is formed in a rectangular shape and designed to expose the spindle portion 242 so that the disk can be accessed and scanned in the drive. The upper frame 220 is divided into a first lower frame region 220 and a second lower frame region 230 with reference to an end of the region of the spring portion 242.

The first lower frame 220 is formed in a sliding window structure so that a portion of the disk 240 from the spindle portion 242 to an outer end of the disk can be selectively exposed.

FIG. 3 illustrates a state where the spindle portion 242 and a diameter portion of the disk 240 are exposed by the operation of the first lower frame 220.

The first lower frame 220 partly defines a disk seating space 224 in which the disk 240 is located. A disk protecting pad may be inserted. The disk seating space 224 is formed in a semi-circular shape corresponding to an outer circumference of the disk 224.

The second lower frame 230 is sized such that, when the first lower frame 220 is closed, it can abut the first lower frame 220 and enclose a remaining portion of the disk 240. The second lower frame 230 is fixedly coupled to the upper frame 210 to define a remaining disk seating space.

The disk seating space 224 is designed to minimize a thickness of the disk cartridge 200.

Figure 4:
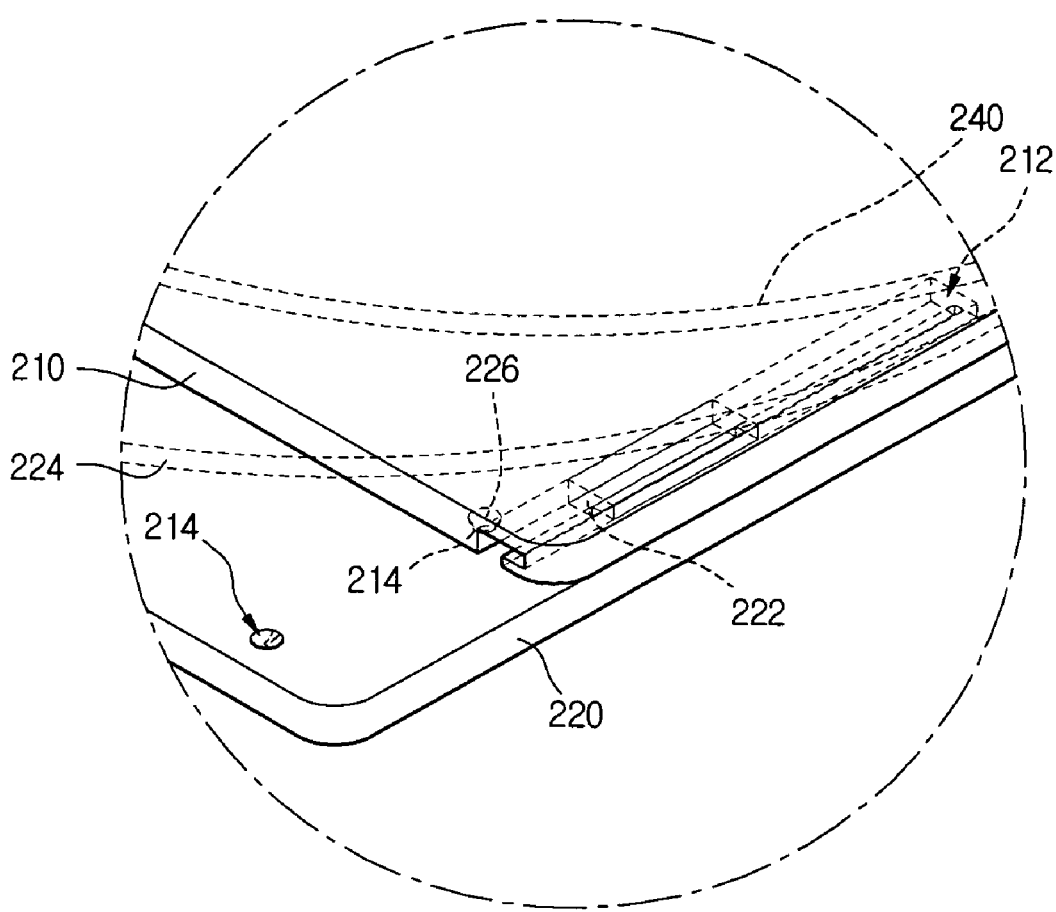
Figure 5:
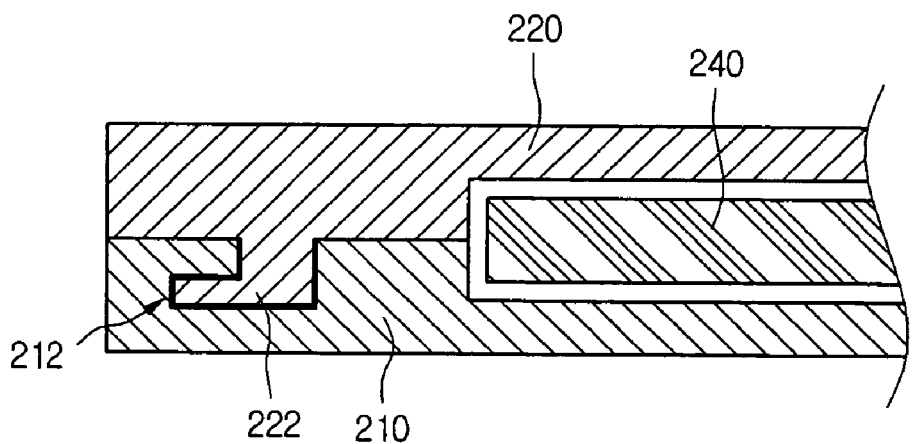

FIG. 4 shows an enlarged perspective view illustrating a coupling state of the rail groove 212 and a hook member 222 of the disk cartridge 200 according to the first embodiment and FIG. 5 shows a partial sectional view illustrating a coupling state of the disk cartridge 200 according to the first embodiment.

Referring to FIGS. 4 and 5, the two parallel rail grooves 212 are formed on the opposite bottom edge portions of the upper frame 210. The rail grooves 212 are designed to have a length capable of exposing at least a portion of the spindle portion 242 when the first lower frame 220 is opened.

The rail groove 212 has a section formed in a L-shape to function as a guide allowing the lower frame 220 to be slidably coupled to the upper frame 210.

Furthermore, the hook members 222 are formed on a top surface of the first lower frame 220 to correspond to the rail grooves 212. The hook members 222 are slidably inserted in the rail grooves 212. The first lower frame 220 is opened and closed relative to the upper frame 210 through the hook members 222.

Likewise the rail grooves 212, each of the hook members 222 has a section formed in a L-shape to be slidably engaged with the corresponding rail groove 212.

The location, structure and number of the rail grooves 212 and the hook members 222 may be changed. For example, the rail grooves 212 may be formed on the first lower frame 220 while the hook members 222 may be formed on the upper frame 210.

When using the disk cartridge 200 according to the first embodiment of the present invention, the hook members 222 of the first lower frame 220 may be disengaged with the rail grooves 212. Furthermore, when the disk cartridge 200 according to the first embodiment of the present invention is inserted and accessed in the disk drive, the first lower frame 220 may move not to sufficiently expose the predetermined surface of the disk 240.

Considering the above, it is preferable that the first lower frame 220 is elastically fitted to the upper frame 210 when the first lower frame 220 is opened or closed. The elastic fitting may be realized by a snap-fit structure.

That is, two snap-fit cuts (small-sized grooves) 214 may be formed on the top surface of the first lower frame 220 and spaced apart from each other by a predetermined distance. This is to elastically fit the first lower frame 220 to the upper frame 210 when the first lower frame 220 is opened or closed.

A distance between the snap-fit cuts 214 is identical to that d1 between the first and second lower frames 220 and 230 when the first lower frame 220 is opened.

A snap-fit boss (small-sized projections) 226 is formed on a bottom surface of the upper frame 210 to be elastically fitted with one of the snap-fit cuts 214 as the first lower frame 220 slides.

A disk cartridge according to a second embodiment of the present invention will be now described with reference to the accompanying drawings.

Figure 1:
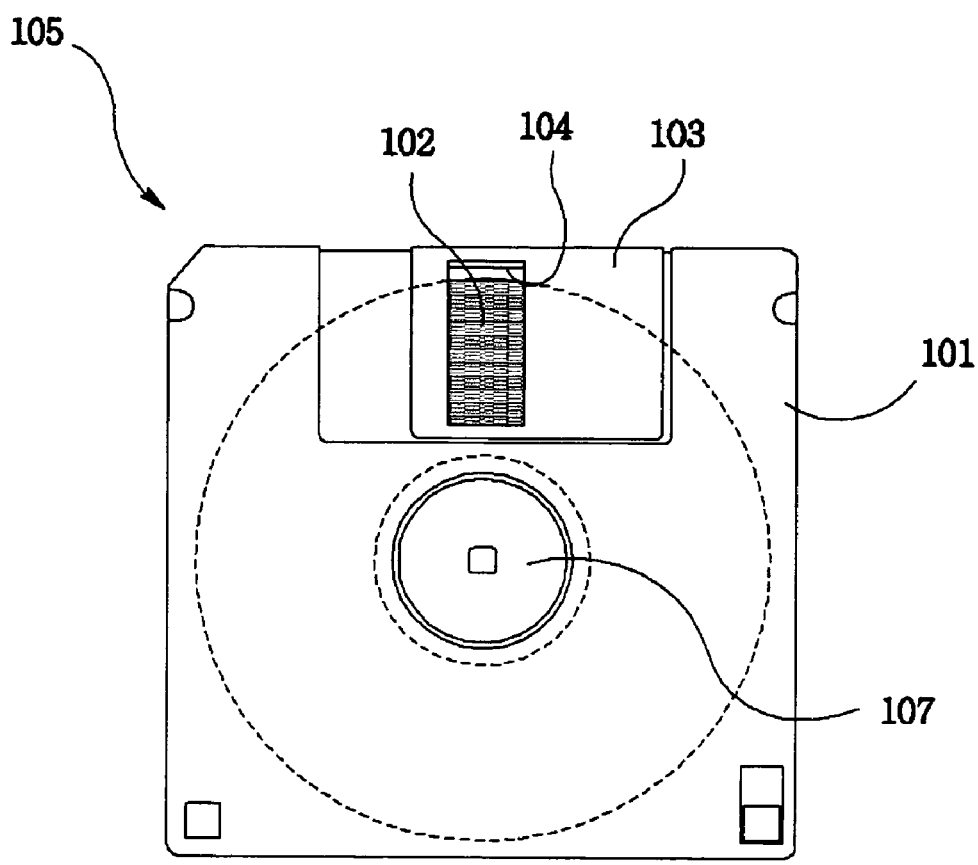
FIGS. 1 and 2 are views of a media cartridge according to the related art.
Figure 2:
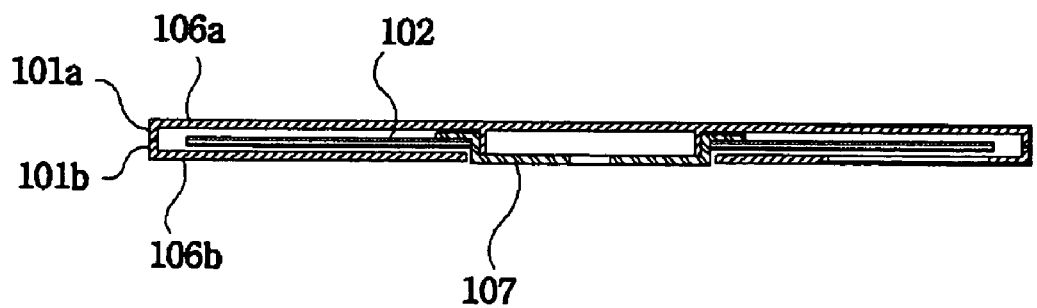

FIG. 2 shows a perspective view illustrating a coupling state of a disk cartridge 300 according to a second embodiment of the present invention.

Figure 6:
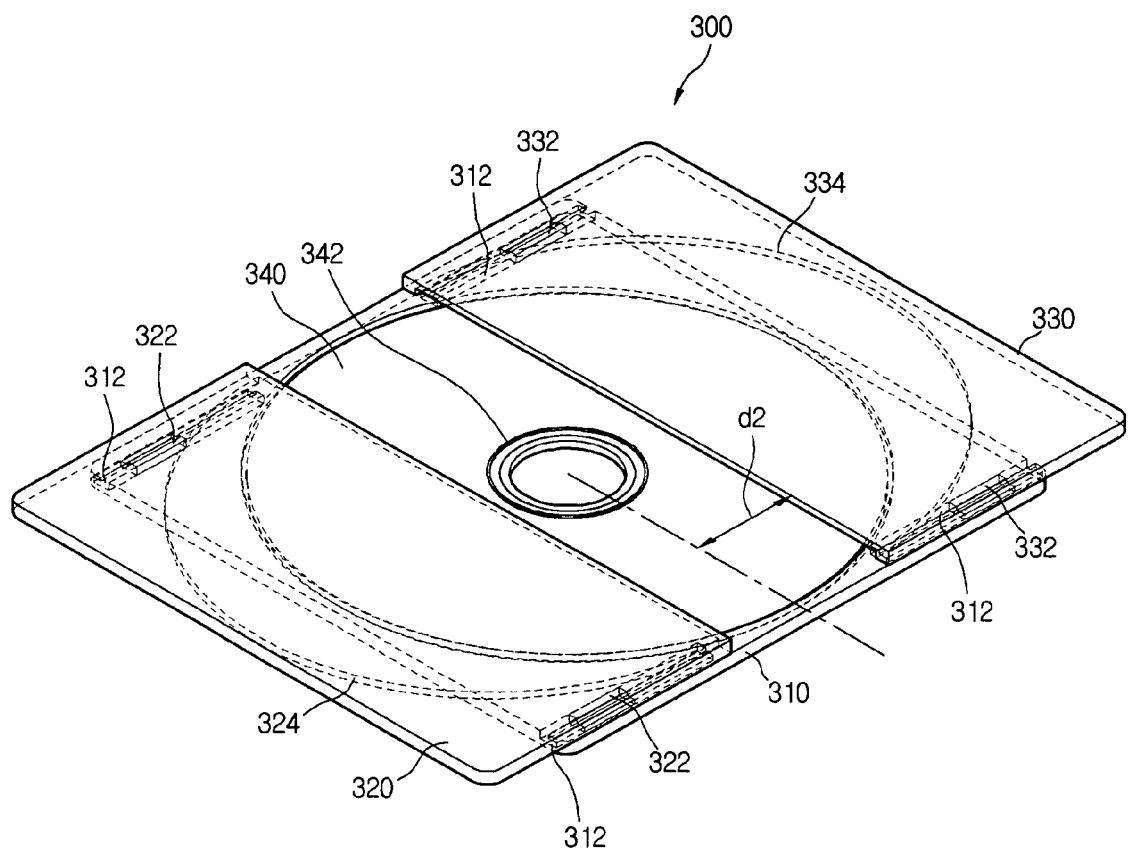
FIGS. 6 through 8 are views of an optical recording media cartridge according to a second embodiment of the present invention.

Referring to FIG. 6, a disk cartridge 300 of this embodiment includes an upper frame 310, a first lower frame 320, a second lower frame 330, and a disk 440. The disk cartridge 300 is similar to that of the first embodiment except that the second lower frame 330 as well as the first lower frame 320 is opened and closed.

The upper frame 310 is formed of a plate type material defining a housing. Likewise the conventional disk housing, the upper frame 210 is formed in a rectangular shape. The disk 240 is rotatably fixed on a bottom of the upper frame 210. Two pairs of parallel rail grooves 212 are formed on both edge portions of the upper frame 210.

The first and second lower frames 320 and 330 are respectively provided with hook members 322 and 332 that are slidably engaged with the rail grooves 213, thereby defining a sliding window structure. The first and second lower frames 320 and 330 are sized to respectively correspond to first and second halves of the upper frame 310 that are divided based on the spindle portion 342.

That is, since both of the first and second lower frames 320 and 330 are opened away from the spindle portion 342 to expose the spindle portion 242, the sufficient exposed region can be obtained even when the first and second lower frames 320 and 330 slides in a short length so that the disk can be accessed and scanned in the drive. Furthermore, since the internal space of the disk drive can be divisionally obtained, the structural design of the drive becomes easy.

The first and second lower frames 320 and 330 respectively define disk seating spaces 324 and 334 in which the disk is located. The disk seating spaces 324 and 334 are defined in semi-circular shapes corresponding to each half of the disk when the first and second lower frames 320 and 330 are closed.

The disk seating spaces 324 and 334 are designed to minimize a thickness of the disk cartridge 300.

Figure 7:
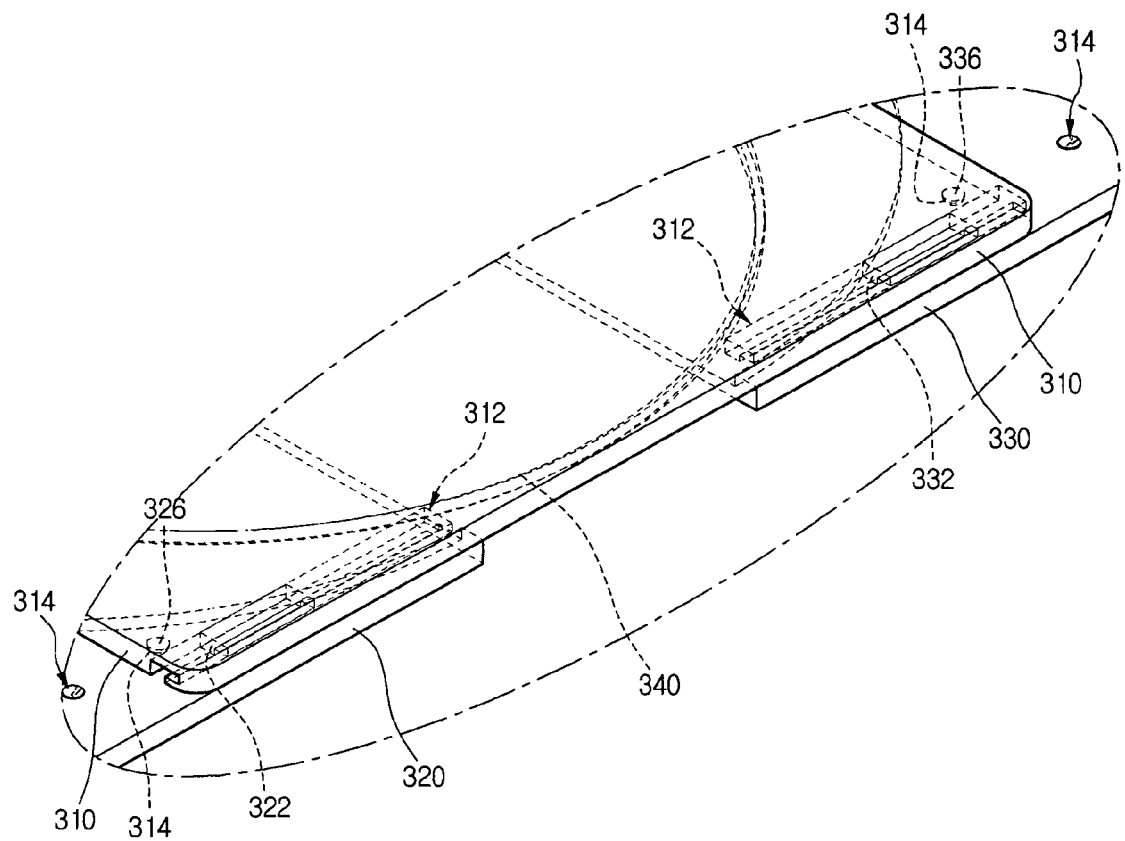

FIG. 7 shows an enlarged perspective view illustrating a coupling state of the rail grooves 312 and the hook members 322 and 332 of the disk cartridge 300 according to the second embodiment and FIG. 5 shows a partial sectional view illustrating a coupling state of the disk cartridge 300 according to the second embodiment.

Figure 8:
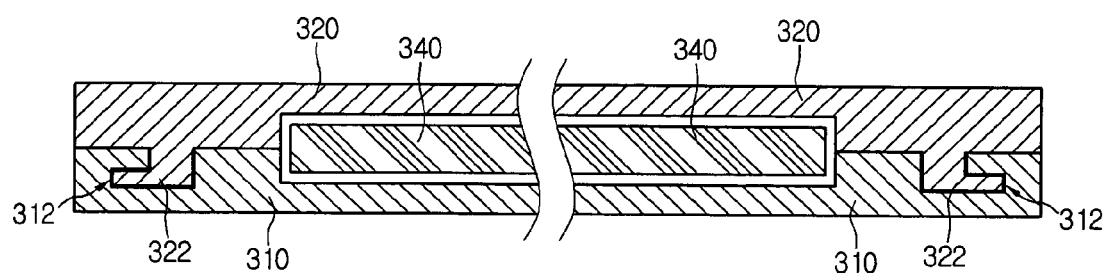

Referring to FIGS. 6 through 8, the two pairs of parallel rail grooves 312 formed on the upper frame 310 are designed to each have a length capable of exposing at least a portion of the spindle portion 342 when the first and second lower frames 320 and 330 are opened.

The rail groove 312 has a section formed in a L-shape to function as a guide allowing the first and second lower frames 320 to be slidably coupled to the upper frame 310.

Furthermore, the hook members 322 and 332 are formed on the respective first and second lower frames 320 and 330 to correspond to the rail grooves 312. The hook members 322 and 332 are slidably inserted in the rail grooves 312.

Likewise the rail grooves 312, each of the hook members 322 and 332 has a section formed in L-shape to be slidably engaged with the corresponding rail groove 312.

The location, structure and number of the rail grooves 312 and the hook members 322 and 332 may be changed. For example, the rail grooves 312 may be formed on the first lower frame 320 while the hook members 322 and 322 may be formed on the upper frame 310.

Likewise the first embodiment, it is preferable that the first and second lower frames 320 and 330 are snap-fitted to the upper frame 310.

That is, two pairs of snap-fit cuts 314 may be formed on the respective top surfaces of the first and second lower frames 320 and 330 and spaced apart from each other by a predetermined distance.

A distance between the pair of snap-fit cuts 314 is identical to that d2 between each of the first and second lower frames 320 and 330 and a center of the spindle 342 when the first and second lower frames 320 and 330 are opened.

Two snap-fit bosses 326 and 336 are formed on a bottom surface of the upper frame 210 to be snap-fitted with one of each pair of the snap-fit cuts 314 as the first and second lower frames 320 and 330 slide between the pair of snap cuts 314.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical recording media cartridge comprising;
    an optical recording medium;
    an upper frame facing a first surface of the optical recording medium, the optical recording medium rotatably coupled to the upper frame; and
    a lower frame facing a second surface of the optical recording medium, the lower frame being slidably coupled to the upper frame,
    wherein one of the upper and lower frames is provided with a rail groove and the other of the upper and lower frames is provided with a hook member engaged with the rail groove.

2. The optical recording media cartridge according to claim 1, wherein the upper frame is provided with a rail groove and the lower frame is provided with a hook member engaged with the rail groove.

3. The optical recording media cartridge according to claim 1, wherein the lower frame comprises a first lower frame slidably coupled to the upper frame and a second lower frame fixedly coupled to the upper frame.

4. The optical recording media cartridge according to claim 1, wherein a spindle portion and portion of the second surface of the optical recording medium are exposed as the lower frame slides.

5. The optical recording media cartridge according to claim 1, wherein the lower frame is provided with an optical recording medium seating portion formed in a shape corresponding to that of the optical recording medium.

6. The optical recording media cartridge according to claim 1, wherein the upper frame is provided with an optical recording medium seating portion formed in a shape corresponding to that of the optical recording medium.

7. The optical recording media cartridge according to claim 1, wherein one of the upper and lower frames is provided with a snap boss and the other of the upper and lower frames is provided with a snap-fit cut.

8. An optical recording media cartridge comprising;
    an optical recording medium;
    an upper frame facing a first surface of the optical recording medium, the optical recording medium rotatably coupled to the upper frame; and
    first and second lower frames facing a second surface of the optical recording medium, the first and second lower frames being slidably coupled to the upper frame,
    wherein the upper frame is provided with rail grooves and the each of the first and second lower frames is provided with a hook member engaged with the rail grooves.

9. The optical recording media cartridge according to claim 8, wherein a spindle portion and portion of the second surface of the optical recording medium are exposed as the first and second lower frames slide.

10. The optical recording media cartridge according to claim 8, wherein the first and second lower frames are provided with an optical recording medium seating portion formed in a shape corresponding to that of the optical recording medium.

11. The optical recording media cartridge according to claim 8, wherein the upper frame is provided with an optical recording medium seating portion formed in a shape corresponding to that of the optical recording medium.

12. An optical recording media cartridge comprising:
an optical recording medium;
a first frame coupled to the optical recording medium; and
a second frame slidably coupled to the first frame to selectively expose a diameter portion of the optical recording medium,
wherein one of the first and second frames is provided with a rail groove and the other of the first and second frames is provided with a hook member engaged with the rail groove.

13. The optical recording media cartridge according to claim 12, wherein a portion of the second frame is fixedly coupled to the first frame and the other portion of the second frame is slidably coupled to the first frame.

14. The optical recording media cartridge according to claim 12, wherein the first frame faces a first surface of the optical recording medium and the second frame faces a second surface of the optical recording medium.

15. The optical recording media cartridge according to claim 12, wherein the first frame is provided with a rail groove and the second frame is provided with a hook member engaged with the rail groove.

16. The optical recording media cartridge according to claim 12, wherein a spindle portion of the optical recording medium is exposed as the second frame slides.

17. The optical recording media cartridge according to claim 12, wherein the first frame is provided with an optical recording medium seating portion formed in a shape corresponding to that of the optical recording medium.

18. The optical recording media cartridge according to claim 12 wherein the second frame is provided with an optical recording medium seating portion formed in a shape corresponding to that of the optical recording medium.

* * * * *